United States Patent [19]
Karino et al.

[11] Patent Number: 6,155,114
[45] Date of Patent: Dec. 5, 2000

[54] SENSOR DEVICE

[75] Inventors: Kazuya Karino; Kazuo Yuhi, both of Miyazaki, Japan

[73] Assignee: Honda Lock Mfg. Co., Ltd., Japan

[21] Appl. No.: 09/215,333

[22] Filed: Dec. 18, 1998

[30] Foreign Application Priority Data

| Dec. 18, 1997 | [JP] | Japan | ................................. | 9-348801 |
| Dec. 18, 1997 | [JP] | Japan | ................................. | 9-348802 |
| Dec. 18, 1997 | [JP] | Japan | ................................. | 9-348803 |
| Sep. 22, 1998 | [JP] | Japan | ................................. | 10-268349 |

[51] Int. Cl.$^7$ ................................................ G01B 7/14
[52] U.S. Cl. ........................................................ 73/493
[58] Field of Search ............................... 73/493, 514.39, 73/866.5, 431; 29/595, 855, 856; 324/207.24, 207.25, 207.2, 173, 174

[56] References Cited

U.S. PATENT DOCUMENTS 5,231,758  8/1993  Schaver .
5,712,562  1/1998  Berg .
5,789,920  8/1998  Gass ......................................... 324/207.25

Primary Examiner—Robert Raevis
Attorney, Agent, or Firm—LIniak, Berenato, Longacre & White

[57] ABSTRACT

A sensor device comprising a housing, an IC module having a detection portion contained in the housing and a cord having a plurality of signal lines covered with an insulative covering material, one end of the covering material being joined to the rear end of the housing, and the signal lines extended from the covering material being connected with the IC module, wherein the housing is composed of an inner core molded from a soft synthetic resin so as to cover the covering material, the signal lines extended from the covering material, the IC module and connection portions between the signal lines and the IC module, and an outer shell made of a rigid synthetic resin and molded to the outer periphery of the inner core. A protector for protecting the IC module is previously attached to the inner core.

The number of parts for constituting the sensor can be reduced and troublesome fabrication can be facilitated.

7 Claims, 16 Drawing Sheets

SENSOR DEVICE

BACKGROUND OF THE INVENTION

1. Field of the Invention

The present invention concerns a sensor device comprising a housing that can be secured to a fixed support, an IC module having a detection portion and housed and fixed in the housing so that the-detection portion is disposed at the top end of the housing, and a cord in which a plurality of signal lines are covered with an insulative covering material joined at one end to the rear end of the housing, and the signal lines extended from one end of the insulative covering material are connected to the IC module in the housing. More in particular, the invention relates to a sensor device used suitably as a vehicular wheel speed sensor.

2. Statement of the Related Art

In the prior art, such a sensor device has already been known, for example, in Japanese Published Unexamined Utility Model Application No. Hei 6-76865.

In this prior art device, a housing is used for positioning and fixing an IC module at a fixed position while ensuring good sealing for connection portions between an IC module and signal lines, and the housing comprises a casing for containing the IC module, a holder which is mounted at one end of an insulative covering material of a cord and holds one end of the insulative covering material, and a synthetic resin molded portion for covering the connection portions between the signal lines and the IC module while joining the casing and the holder. Therefore, this requires a considerable number of parts for constituting the housing.

In another prior art sensor device, a housing comprises a casing for housing an IC module, a holder which is mounted at one end of an insulative covering material of a cord, holds one end of the insulative covering material and is positioned and mounted in the casing, an IC module, connection portions between the IC module and signal lines, and a potting material filled in the casing so as to cover a part of the holder. However, this also requires a considerable number of parts for constituting the housing.

In a further prior art device, a metallic protector for covering the detection portion of an IC module disposed at the top end of a housing is attached to the housing in order to protect the IC module. In this case, the protector is generally attached to the outside of the housing by joining means such as caulking. Therefore, the work of attaching the protector is troublesome.

OBJECT OF THE INVENTION

The present invention has been made in view of the above situation and, accordingly, an object thereof is to provide a sensor device in which a housing can be composed of a reduced number of parts.

Another object of the present invention is to provide a sensor device in which the direction of a cord extending from a housing can be changed easily, and a good sealing can be ensured.

A further object of the present invention is to provide a sensor device with improved productivity.

A further object of the present invention is to provide a sensor device capable of ensuring good insulation between signal lines.

A still further object of the present invention is to provide a sensor device having a protector in which a housing is composed of a reduced number of parts and a protector can be attached to the housing easily and securely.

SUMMARY OF THE INVENTION

In accordance with a first feature of the present invention, the foregoing objects can be attained by a sensor device comprising:

a housing capable of being secured to a fixed support;

an IC module having a detection portion, the module being housed and fixed in the housing so that the detection portion is disposed at the top end of the housing; and a cord in which a plurality of signal lines are covered with an insulative covering material, one end of the covering material is joined to the rear end of the housing, and the portions of the signal lines extended from one end of the insulative covering material are electrically connected with the IC module in the housing, wherein the housing is composed of:

an inner core which is molded from a synthetic resin so as to cover one end of the insulative covering material, the signal lines extended from one end of the insulative covering material, the IC module and connection portions between each of the signal lines and the IC module and an outer shell made of a synthetic resin and molded to the outer periphery of the inner core so as to cover the inner core.

In such a constitution, since the housing is constituted by the inner core and the outer shell and each of the components is molded from a synthetic resin, at least the casing needed in the prior art for housing the IC module is no more necessary, and the number of parts for constituting the housing can be reduced.

In a preferred embodiment, the inner core is made of a soft synthetic resin and the outer shell is made of a rigid synthetic resin.

In this embodiment, since the inner core is formed of a relatively soft synthetic resin, the inner core can be bent easily in any direction before the outer shell is molded covering the inner core. In addition, the direction of the cord extended from the housing can be changed easily. Also, the inner core and the outer shell can be brought into intimate contact with each other by the elasticity of the relatively soft inner core, thereby ensuring good sealing.

In another preferred embodiment of the invention, the inner core has, at the outer circumference thereof, engaging protrusions for engagement with and abutting on positioning recesses disposed to a mold device for molding the outer shell in order to position the inner core relative to the outer shell.

In this embodiment, when the inner core is inserted into the mold device at the time of molding the outer shell, engaging protrusions of the inner core engage with and abut on the positioning recesses provided on the mold device, so that the position of the inner core in the mold device, namely, the position of the inner core relative to the outer shell is determined easily, and the relative position between the inner core and the outer shell can be determined accurately without using any additional positioning means, thereby enabling to enhance the productivity of the housing.

In a further preferred embodiment, a through hole is formed in the inner core at a location between each of the connection portions of the signal lines, the through hole being filled with a molten resin of the outer shell upon its molding.

In this embodiment, even if the connection portions are located close to each other, short-circuit between each of the connection portions can be prevented to ensure good insulation between the signal lines.

In accordance with a second feature of the present invention, there is provided a sensor device comprising;

a housing capable of being secured to a fixed support;

an IC module having a detection portion, the module being housed and fixed in the housing so that the detection portion is disposed at the top end of the housing; and a cord in which a plurality of signal lines are covered with an insulative covering material, one end of the covering material is joined to the rear end of the housing, and the portions of the signal lines extended from one end of the insulative covering material are electrically connected with the IC module in the housing, and a metallic protector attached to the housing so as to cover the detection portion, wherein the housing is composed of:

an inner core which is molded from a synthetic resin so as to cover one end of the insulative covering material, the signal lines extended from one end of the insulative covering material, the IC module and connection portions between each of the signal lines and the IC module, to which the protector is attached to form an inner core assembly, and an outer shell made of a synthetic resin and molded to the outer periphery of the inner core so as to cover the inner core such that a part of the protector is exposed to the outside.

According to the second feature of the invention, since the housing is composed of the inner core and the outer shell, the casing needed so far for housing the IC module is no more required and the number of parts for constituting the housing can be reduced.

Moreover, since the protector has been attached as a part of the inner core assembly to the housing before molding of the outer shell, the troublesome work for attaching the protector to the already completed housing is no more required and the protector can be attached to the housing easily.

PREFERRED EMBODIMENTS OF THE INVENTION

Preferred embodiments of the present invention will be described below with reference to the accompanying drawings.

FIG. 1 to FIG. 10 show preferred embodiments according to the first aspect of the present invention applied to a vehicular wheel speed sensor.

Figure 1:
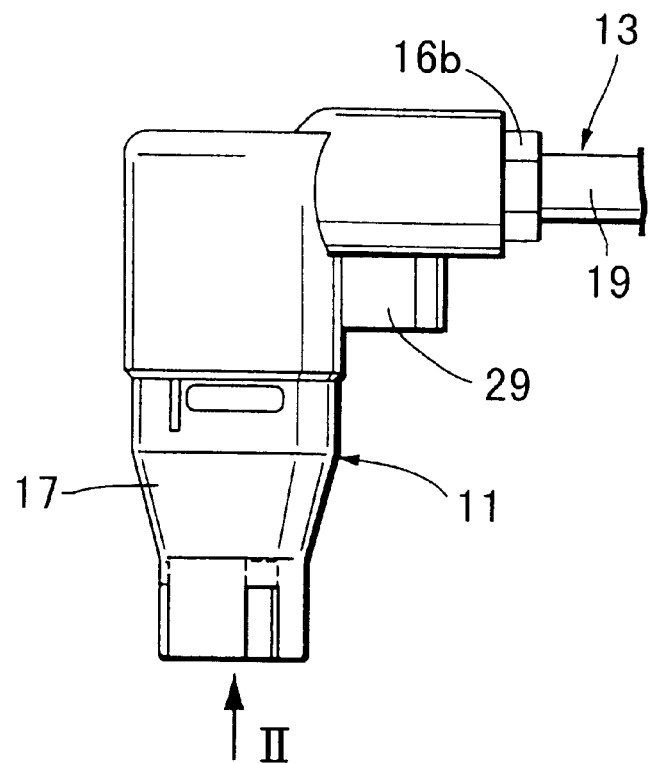
FIG. 1 is a side elevational view of a sensor device according to the first aspect of the present invention.
Figure 2:
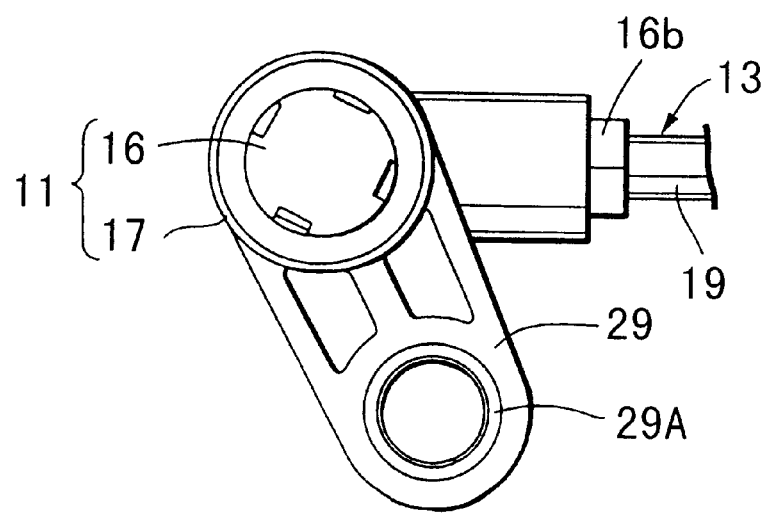
FIG. 2 is a view taken in the direction of arrow II in FIG. 1.
Figure 3:
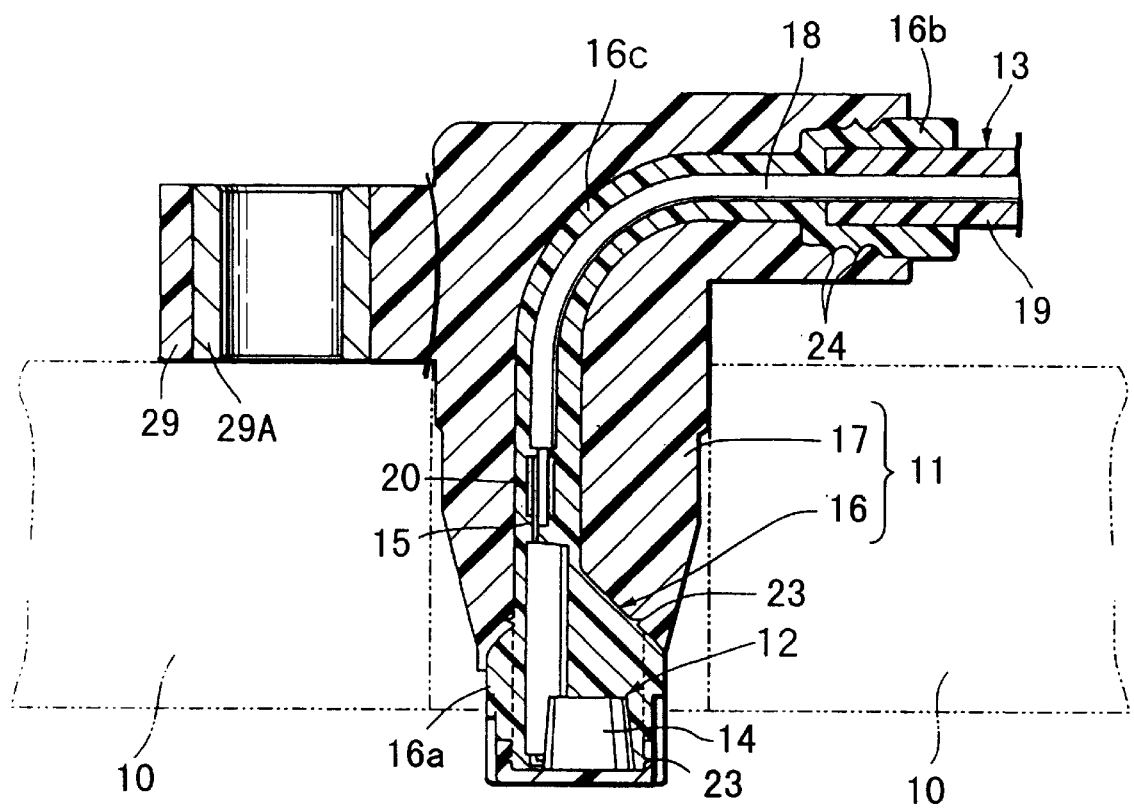
FIG. 3 is a longitudinal cross sectional view of the sensor device.
Figure 4:
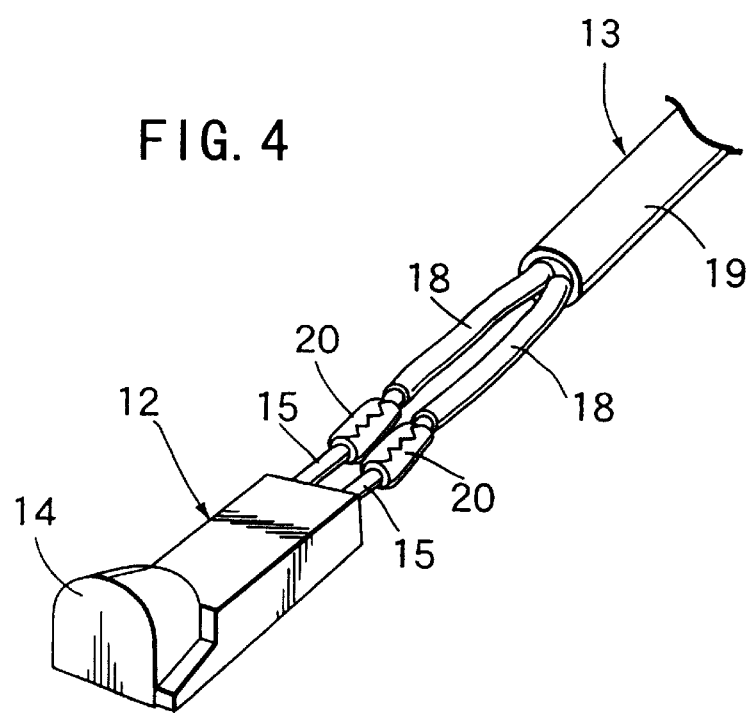
FIG. 4 is a perspective view showing a connecting state of an IC module and a cord.
Figure 5:
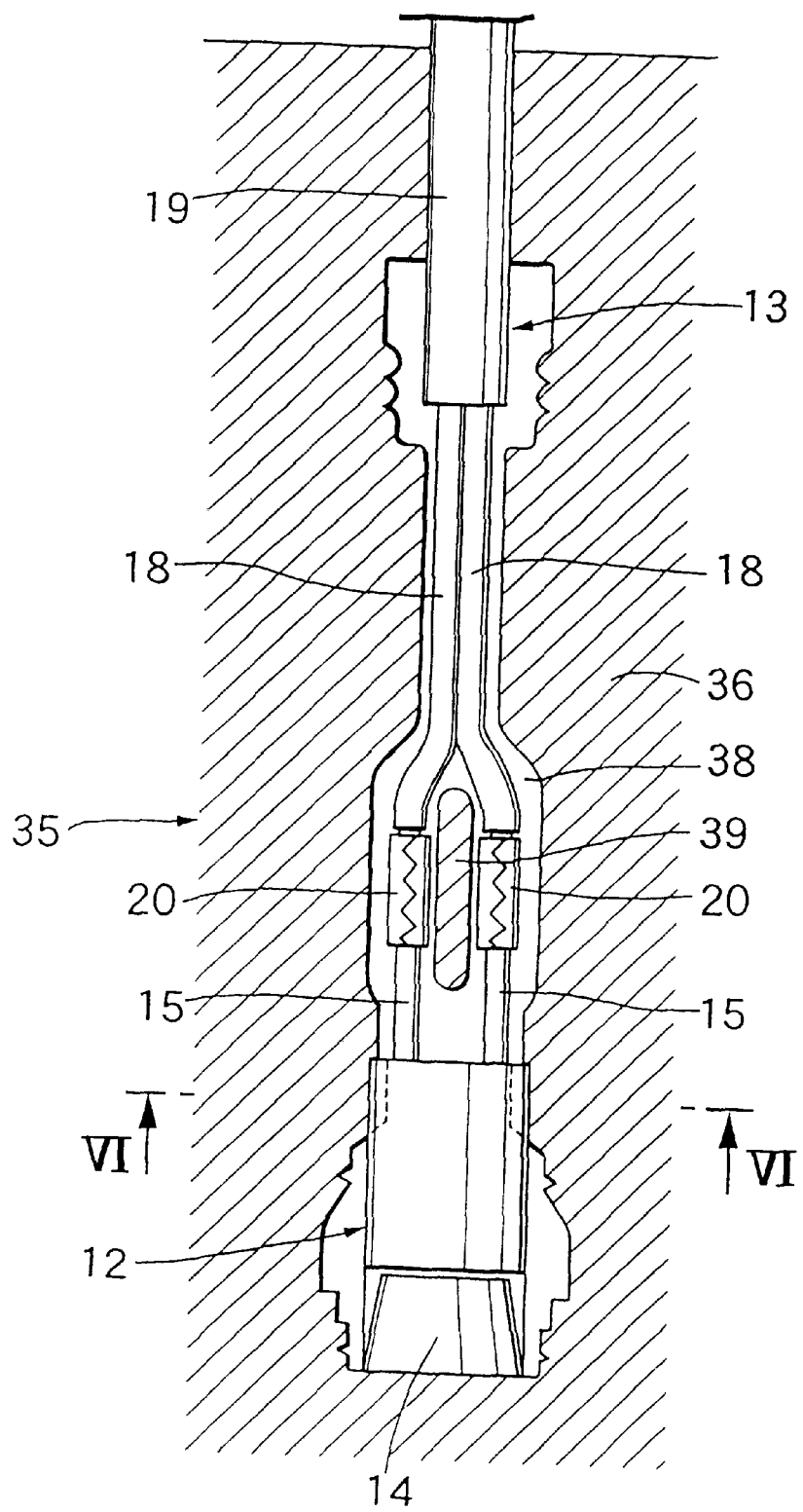
FIG. 5 is a longitudinal cross sectional view of a mold device for molding an inner core, taken along line V—V in FIG. 6.
Figure 6:
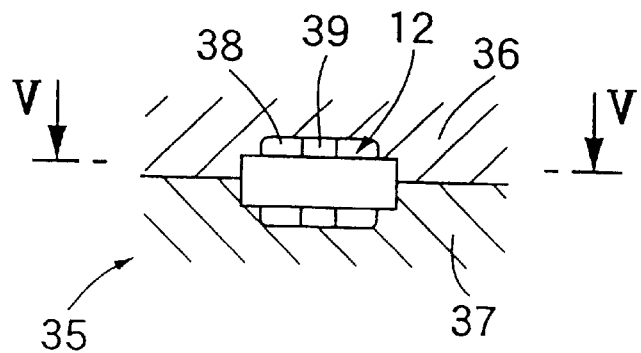
FIG. 6 is an enlarged cross sectional view taken along line VI—VI of FIG. 5.
Figure 7:
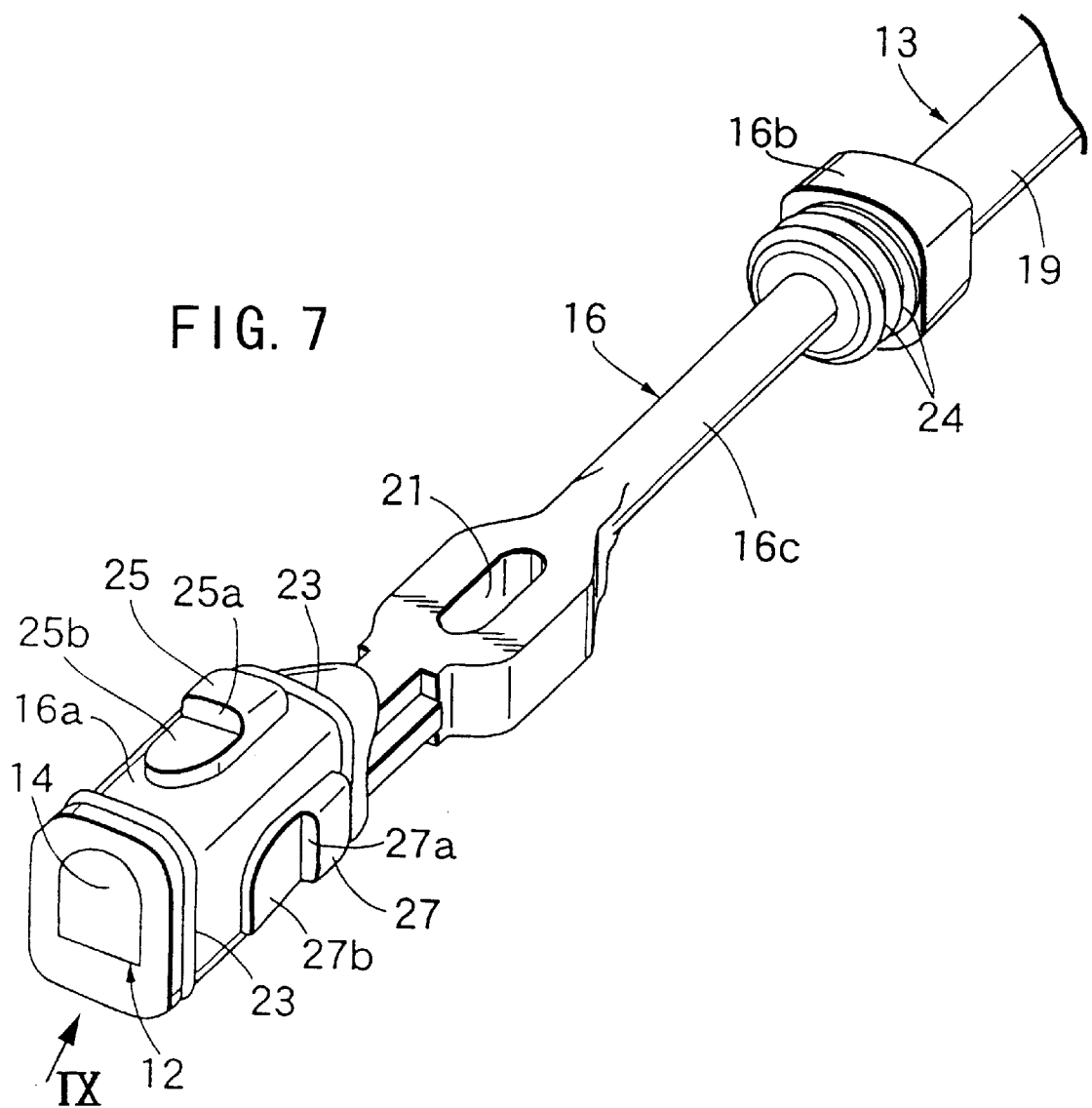
FIG. 7 is a perspective view of an inner core.
Figure 8:
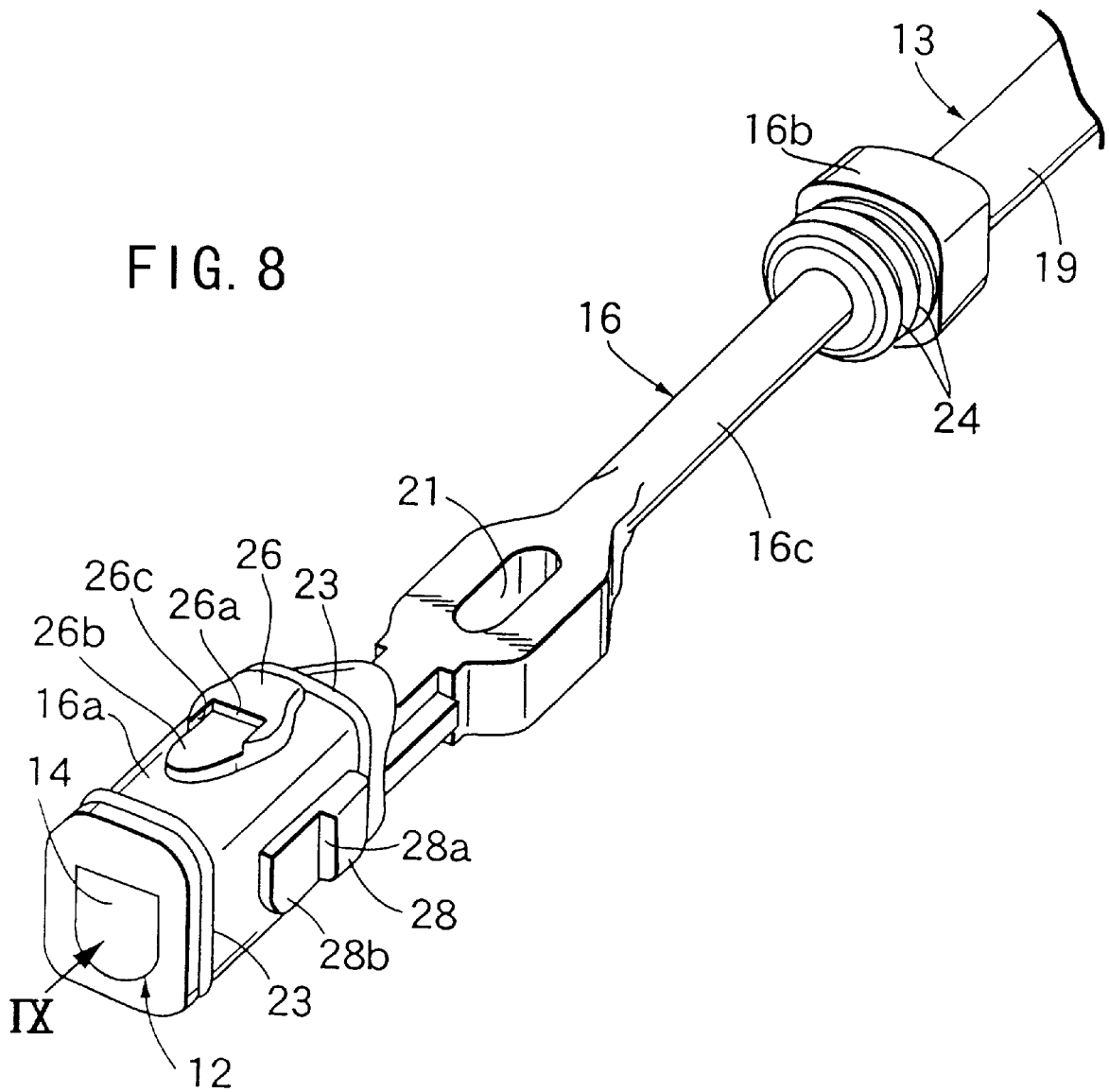
FIG. 8 is a perspective view of the inner core as viewed from the side opposite to FIG. 7.
Figure 9:
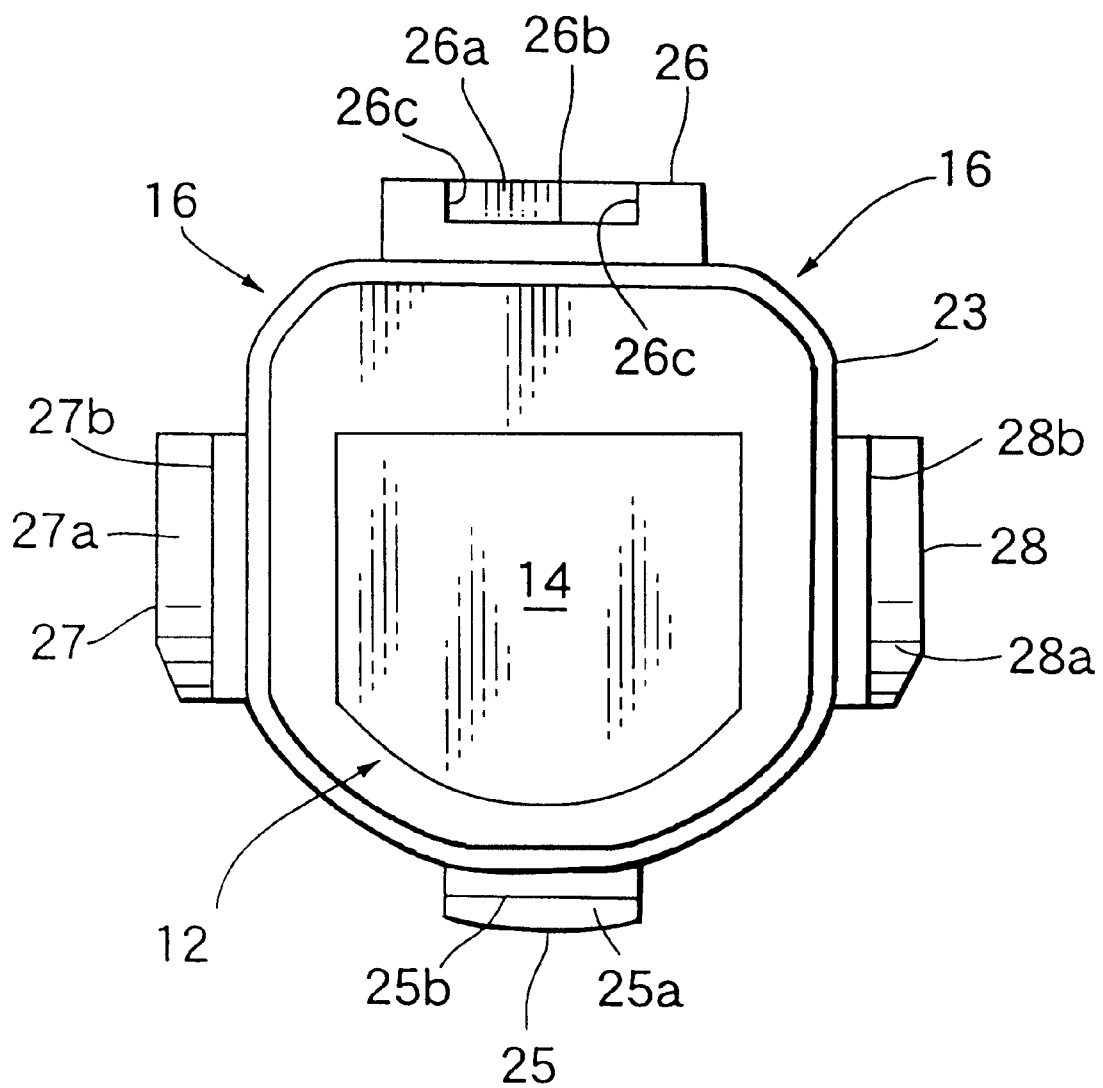
FIG. 9 is an enlarged view taken in the direction of arrow IX in FIG. 8.
Figure 10:
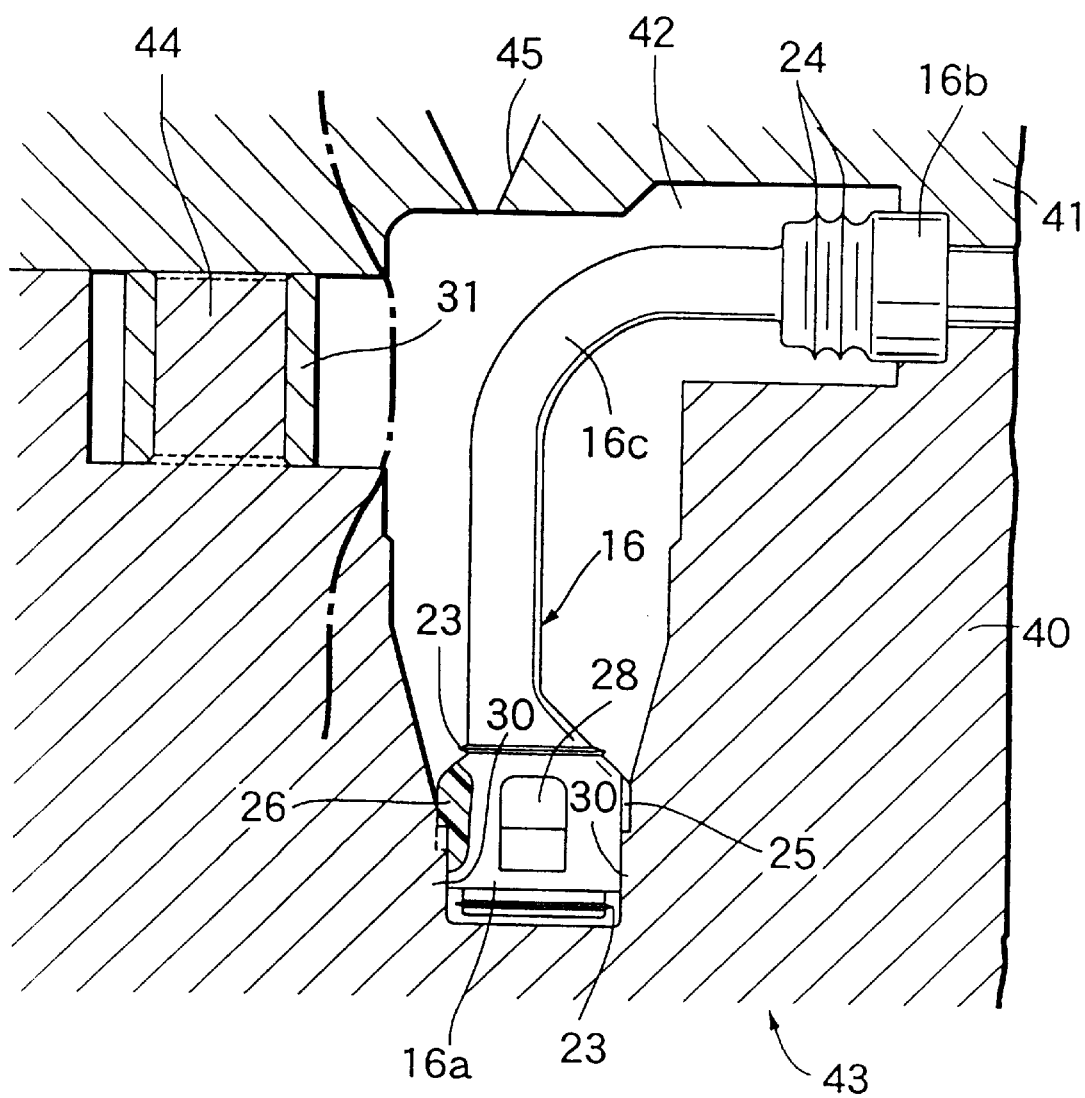
FIG. 10 is a longitudinal cross sectional view of a mold device for molding an outer shell.

FIG. 1 is a side elevational view of a sensor device, FIG. 2 is a view taken in the direction of arrow II in FIG. 1, FIG. 3 is a longitudinal cross sectional view of a sensor device, FIG. 4 is a perspective view showing a connection state of an IC module and a cord, FIG. 5 is a longitudinal cross sectional view of a mold device for molding an inner core taken along line V—V in FIG. 6, FIG. 6 is a cross sectional view taken along line VI—VI in FIG. 5, FIG. 7 is a perspective view of an inner core, FIG. 8 is a perspective view of an inner core as viewed from the side opposite to FIG. 7, FIG. 9 is an enlarged view taken along the direction of arrow IX in FIG. 8 and FIG. 10 is a longitudinal cross sectional view of a mold device for molding an outer shell.

First, referring to FIG. 1 to FIG. 3, this sensor device is used as a vehicular wheel speed sensor. An IC module 12 is housed and fixed in a housing 11 secured to a fixed support 10 and a cord 13 connected to an IC module 12 extends from the housing 11.

The IC module 12 has a detection portion 14 including a magnet and a Hall IC, a capacitor, a substrate, a pair of terminals 15, 15, and the like and is housed and fixed in the housing 11 such that the detection portion 14 is disposed at the top end of the housing 11, and such that the paired terminals 15, 15 are disposed so as to face the rear side.

The housing 11 is made up of an inner core 16 molded from a relatively soft synthetic resin such as polyurethane and an outer shell 17 molded from a relatively hard synthetic resin which is more rigid than the inner core 16 such as glass fiber-incorporated polyamide for covering the inner core 16.

In FIG. 4, the cord 13 comprises a pair of bundled signal lines 18, 18 covered with an insulative covering material 19 formed of a synthetic resin. The portion of each of the signal lines 18, 18 extended from one end of the insulative covering material 19 is connected with each terminal 15, 15 of the IC module 12 by caulking using each of joints 20, 20 made of a conductive metal, welding, or like other means.

The IC module 12 and the cord 13 are connected to each other as shown in FIG. 4, and set in a mold device 35 for molding an inner core shown in FIGS. 5 and 6. This mold device 35 for molding the inner core has a pair of molds 36 and 37 which are separable from each other, and a cavity 38 corresponding to the external shape of the inner core 16 is formed between both of the molds 36 and 37 when they are clamped. The IC module 12 and the cord 13 connected to each other are inserted into the cavity 38 so as to position the IC module 12 between both of the molds 36 and 37. On one of the molds 36 and 37, for example, on the mold 36, a protrusion 39 is provided integrally so as to be interposed between each of the connection portions of the terminals 15, 15 for the IC module 12 and the signal lines 18, 18 of the cord 13.

Then, when a soft synthetic resin such as polyurethane is charged into the cavity 38, an inner core 16 is molded from the soft synthetic resin so as to cover one end of the insulative covering material 19 of the cord 13, the paired signal lines 18, 18 extended from one end of the insulative covering material 19, the IC module 12 and the connection portions between the terminals 15, 15 of the IC module 12 and the signal lines 18, 18.

Referring to FIG. 7 to FIG. 9 together, the inner core 16 is integrally provided with a first covering portion 16a substantially of a polyhedral shape for covering the IC module 12, with the detection portion 14 being disposed flush with the top end, a second covering portion 16b for covering one end of the insulative covering material 19, and a third covering portion 16c for covering the signal lines 18, 18 and the connection portions between the signal lines 18, 18 and the IC module 12 for joining the first and second covering portions 16a, 16b to each other.

In the third covering portion 16c, when the inner core 16 is molded, a through hole 21 is formed between each of the connection portions of the terminals 15, 15 for the IC module 12 and the signal lines 18, 18 extended from one end of the insulative covering material 19, corresponding to the protrusion 39 disposed to the mold 36.

At the outer periphery of the first covering portion 16a, a pair of intruding protrusions 23, 23 are provided around the circumference at positions spaced apart from each other. At the outer periphery of the second covering portion 16b, a pair of intruding protrusions 24, 24 are provided around the circumference at positions spaced apart from each other. The top ends of these intruding protrusions 23, 23; 24, 24 melt and adhere to the inner surface of the outer shell 17 such that the inner core 16 is covered with the outer shell 17 when the latter is molded. They can provide tight engagement between the inner core 16 and the outer shell 17.

The outer periphery of the first covering portion 16a has provided integrally therewith, first and second engagement protrusions 25, 26 being positioned on the sides opposite to each other; and third and fourth engagement protrusions 27, 28 being positioned on the sides opposite to each other so as to be located on a straight line perpendicular to a line connecting both of the first and second engagement protrusions 25, 26.

The first, third, and fourth engagement protrusions 25, 27, 28 are formed with aligning faces 25a, 27a, 28a facing the top end of the first covering portion 16a, respectively, and aligning faces 25b, 27b, 28b facing the outside of the first covering portion 16a, respectively, so that the aligning faces are in continuous with each other at right angles.

The second engagement protrusion 26 is provided with a aligning face 26a facing the top end of the first covering portion 16a, a aligning face 26b facing the outside of the first covering portion 16a and in continuous with the aligning face 26a at a right angle, and a pair of aligning faces 26c, 26c in continuous with the aligning faces 26a and 26b at right angles and facing each other along the peripheral direction of the first covering portion 16a.

When the outer shell 17 is molded, as shown in FIG. 10, the inner core 16 is set in a mold device 43 for molding an outer shell having a lower mold 40 and an upper mold 41 that define therebetween a cavity 42 corresponding to the external shape of the outer shell 12.

The lower mold 40 of this mold device 43 for molding the outer shell is integrally provided with four positioning portions 30, 30 . . . corresponding to the engagement protrusions 25 to 28 of the inner core 11. Of the four positioning portions 30, 30 . . . , three positioning portions 30, 30 . . . engage with and abut on the aligning faces 25a, 27a, 28a of the first, third, and fourth engagement protrusions 25, 27, 28 to position the inner core 16 in the mold device 43 in the direction along the lengthwise direction of the first covering portion 16a. Also, they engage with and abut on the aligning faces 25b, 27b, 28b of the first, third, and fourth engagement protrusions 25, 27, 28 to position the inner core 16 in the mold device 43 in the direction perpendicular to the lengthwise direction of the first covering portion 16a.

The remaining one positioning portion 30 of the four positioning portions 30, 30 . . . engages with and abuts on the aligning face 26a of the second engagement protrusion 26 to position the inner core 16 in the mold device 43 in the direction along the lengthwise direction of the first covering portion 16a. Also, it engages with and abuts on the aligning face 26b of the second engagement protrusion 26 to position the inner core 16 in the mold device 43 in the direction perpendicular to the lengthwise direction of the first covering portion 16a. Further, it engages with and abuts on the aligning faces 26c, 26c of the second engagement protrusion 26 to position the inner core 16 in the mold device 43 in the direction along the peripheral direction of the first covering portion 16a.

As shown in FIG. 1 to FIG. 3, the outer shell 17 is integrally provided with a flange portion 29 extending to the outside. In this flange portion 29, a metallic collar 29A is integrally buried so that a bolt (not shown) for fastening the outer shell 17, namely, the housing 16 to the support 10 is inserted. The lower mold 40 is integrally provided with a core 44 inserted in the collar 29A.

Thus, a rigid synthetic resin such as glass fiber-incorporated polyamide is charged into the cavity 42 through a gate 45 provided in the upper mold 41 in a state where the position of the inner core 16 in the lengthwise direction of the first covering portion 16a and in a plane perpendicular to the lengthwise direction is determined in the mold device 43 for molding the outer shell. Thus, the outer shell 17 is molded by the mold device 43 for molding the outer shell.

The outer shell 17 covers the top end of the inner core 16 in such a manner that the detection portion 14 of the IC module 12 is not exposed to the outside, and also covers the inner core 16 in such a manner that a part of the second covering portion 16b of the inner core 16 is exposed to the outside. Then, the IC module 12 is housed and fixed in the housing 11 made up of the inner core 16 and the outer shell 17 such that the detection portion 14 is disposed at the top end of the housing 11. The cord 13 is extended from the housing 11 such that one end of the insulative covering material 19 is joined with the rear end of the housing 11, and the portions of the signal lines 18, 18 extended from one end of the insulative covering material 19 are connected to the IC module 12 in the housing 11.

When the outer shell 17 is molded, the through hole 21 in the inner core 16 is filled with the synthetic resin constituting the outer shell 17.

Next, the function and the effect of this embodiment will be explained. The housing 11 of this sensor device is made up of the inner core 16 and the outer shell 17, each of which is molded from synthetic resin. Therefore, the casing needed for housing the IC module in the prior art is no more necessary, so that the number of parts for constituting the housing 11 can be reduced.

Moreover, since the inner core 16 is formed of a relatively soft synthetic resin, the inner core 16 can easily be bent in an arbitrary direction before the outer shell 17 is molded covering the inner core 16. Therefore, the direction of the cord 13 extended from the housing 11 can be changed easily. Also, the inner core 16 and the outer shell 17 can be brought into tight engagement to each other by the elasticity of the inner core 16, thereby improving the sealing performance.

At the outer periphery of the inner core 16, there are provided engagement protrusions 25 to 28 which position the inner core 16 relative to the outer shell 17 by engaging with and abutting on the positioning portions 30, 30 . . . provided on the mold device 43 for molding the outer shell 17.

Therefore, when the inner core 16 is inserted into the mold device 43 at the time of molding the outer shell 17, the position of the inner core 16 relative to the outer shell 17 is determined easily, so that the relative position between the inner core 16 and the outer shell 17 can be determined accurately without using any additional positioning means, thereby enabling to improve the productivity of the housing 11.

Further, in the inner core 16, the through hole 21 is formed between each of the connection portions for the signal lines 18, 18 and the terminals 15, 15 of the IC module 12. The through hole 21 is formed by the protrusion 39 provided integrally to the mold 36 corresponding to a location between each of the connection portions when the inner core 16 is molded by the mold device 35 for molding the inner core. Therefore, even if the connection portions are located close to each other, short-circuit between the connection portions and short circuit caused by the mutual contact of fine wires fluffing from the conductors of the signal lines 18, 18 are prevented, so that the inner core 16 and thus the housing 11 can be made smaller in the size while the insulating property being enhanced. Moreover, since the through hole 21 is filled with the outer shell 17 covering the inner core 16, the insulating can be further enhanced.

Embodiment of Protector-Equipped Sensor Device

Preferred embodiments of a sensor device equipped with a protector according to the second aspect of the present invention will be described below with reference to FIG. 11 to FIG. 23.

Figure 11:
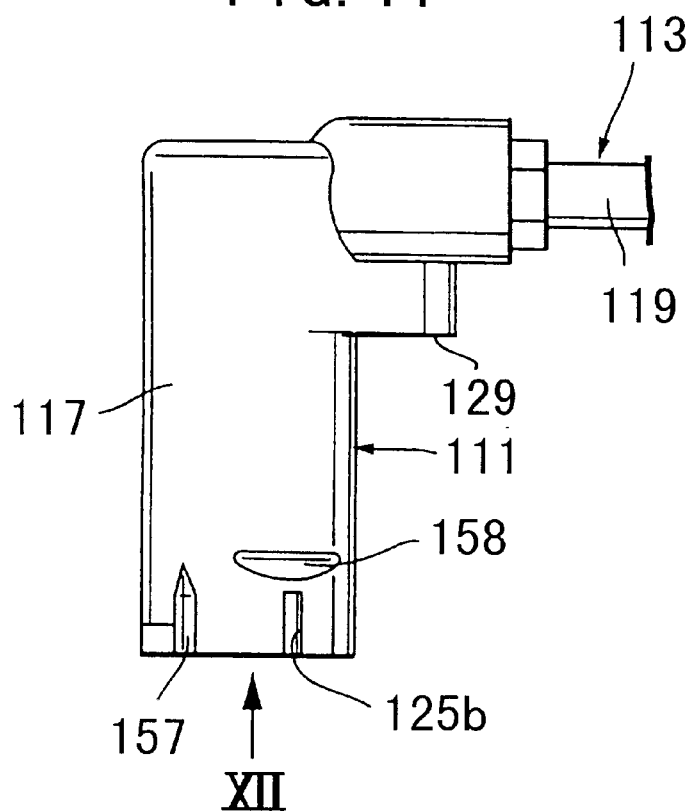
FIG. 11 is a side elevational view of a sensor device according to the second aspect of the present invention.
Figure 12:
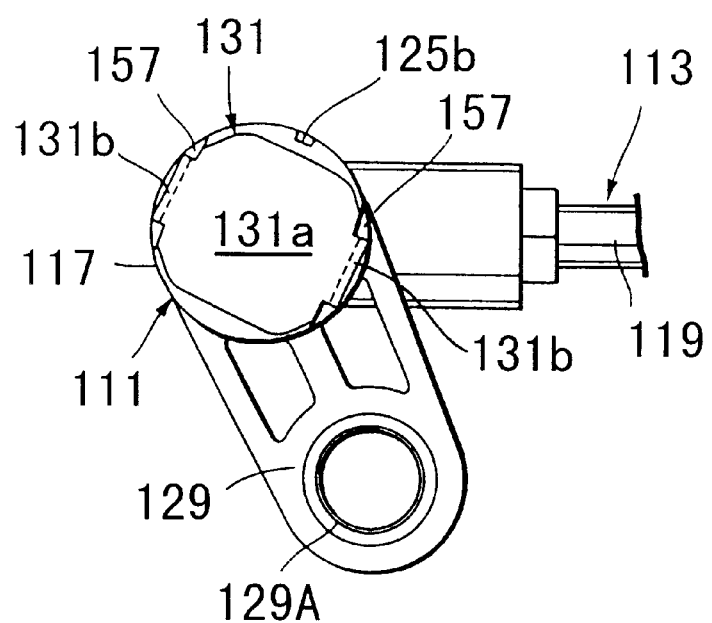
FIG. 12 is a view taken in the direction of arrow XII in FIG. 11.
Figure 13:
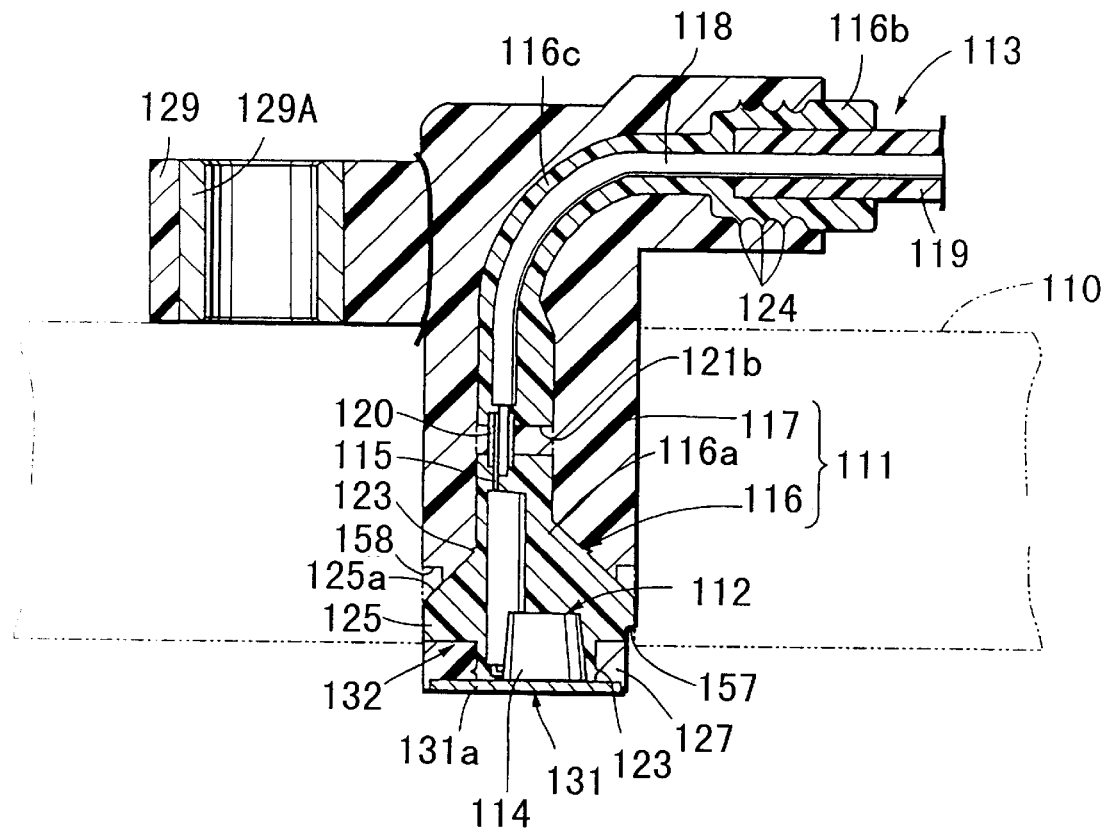
FIG. 13 is a longitudinal cross sectional view of the sensor device.
Figure 14:
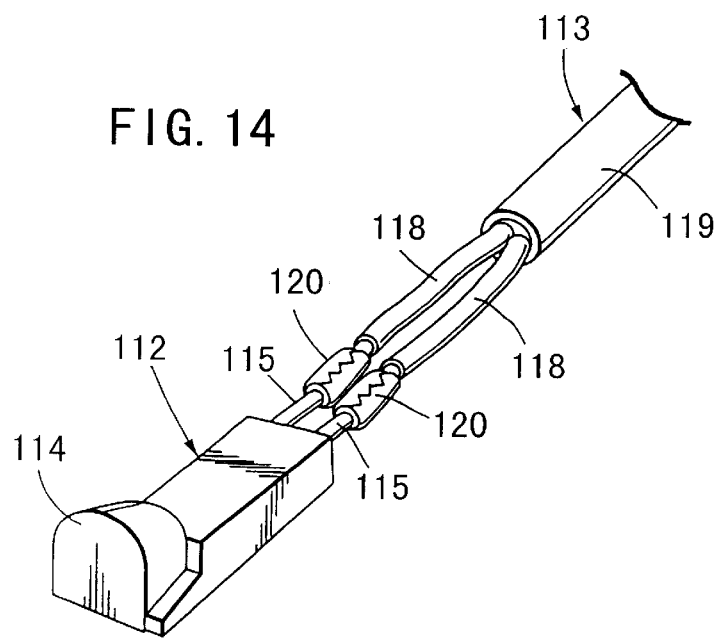
FIG. 14 is a perspective view showing a connecting state of an IC module and a cord.
Figure 15:
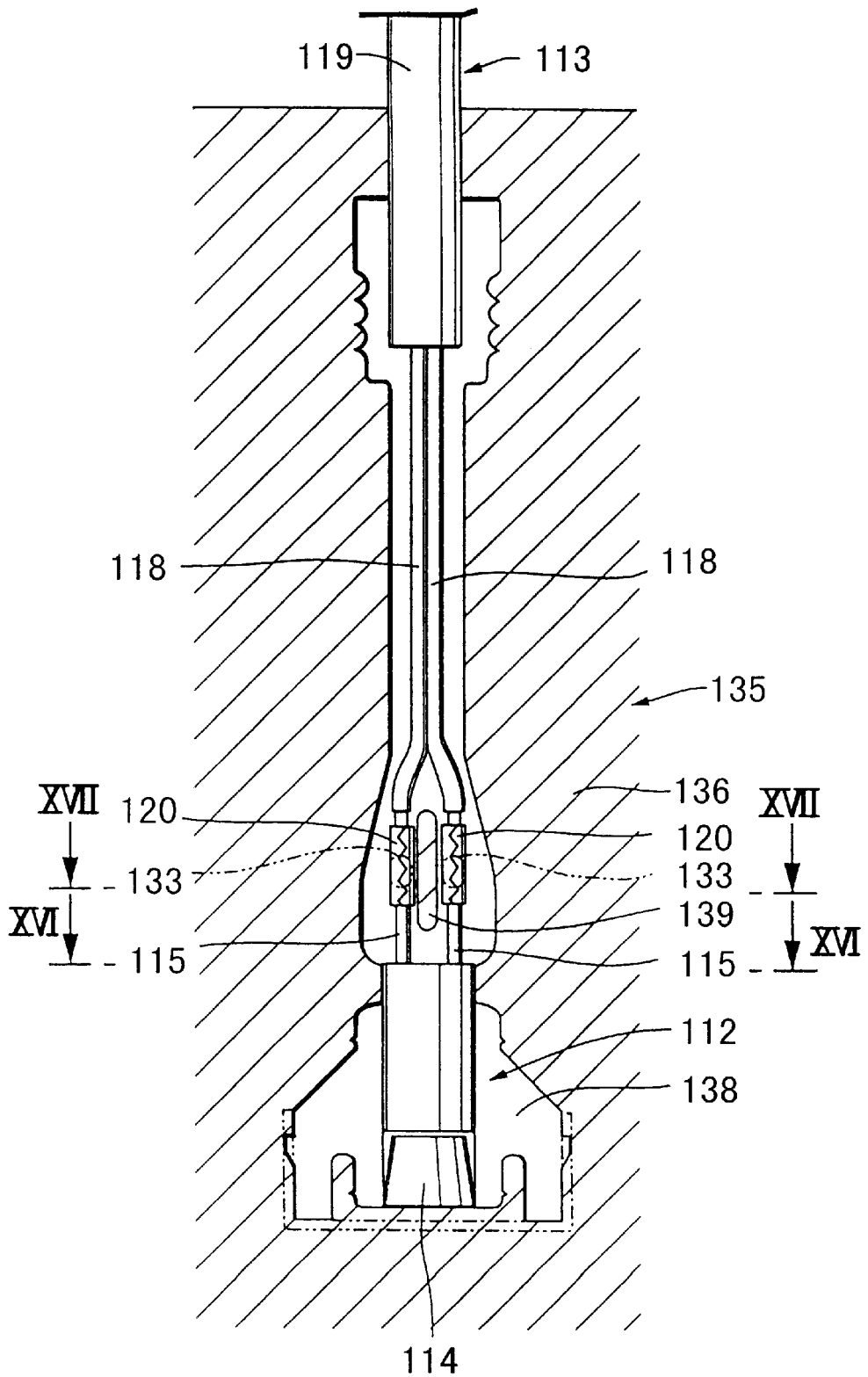
FIG. 15 is a longitudinal cross sectional view of a mold device for molding an inner core, taken along line XV—XV in FIG. 16.
Figure 16:
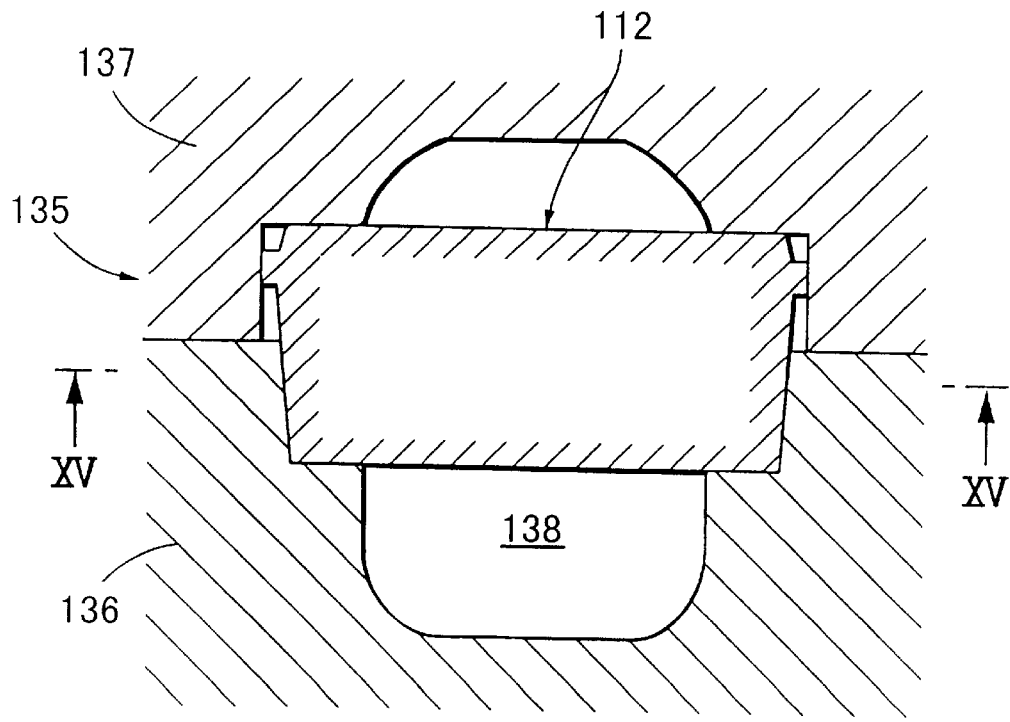
FIG. 16 is an enlarged cross sectional view taken along line XVI—XVI in FIG. 15
Figure 17:
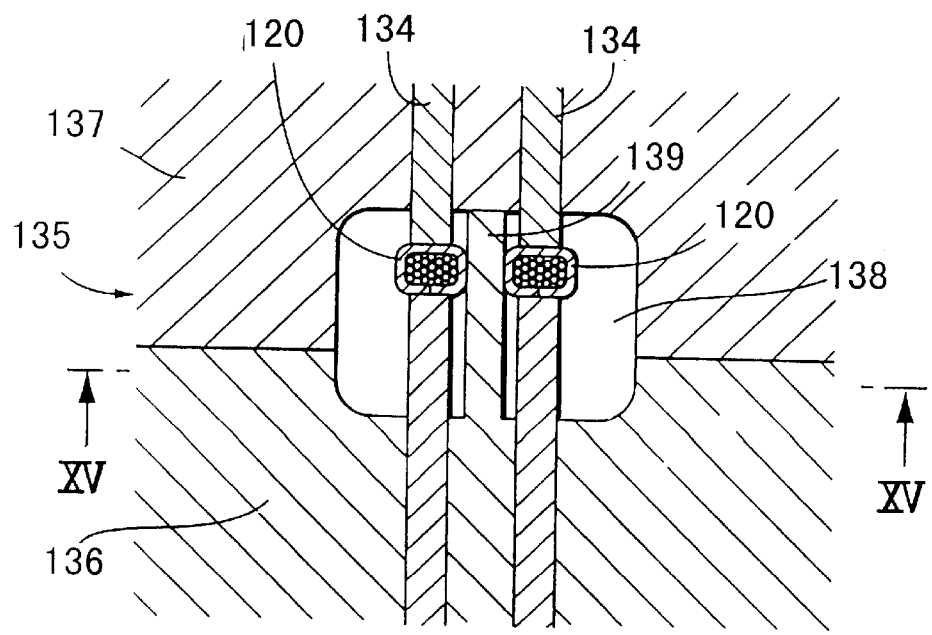
FIG. 17 is an enlarged cross sectional view taken along line XVII—XVII in FIG. 15
Figure 18:
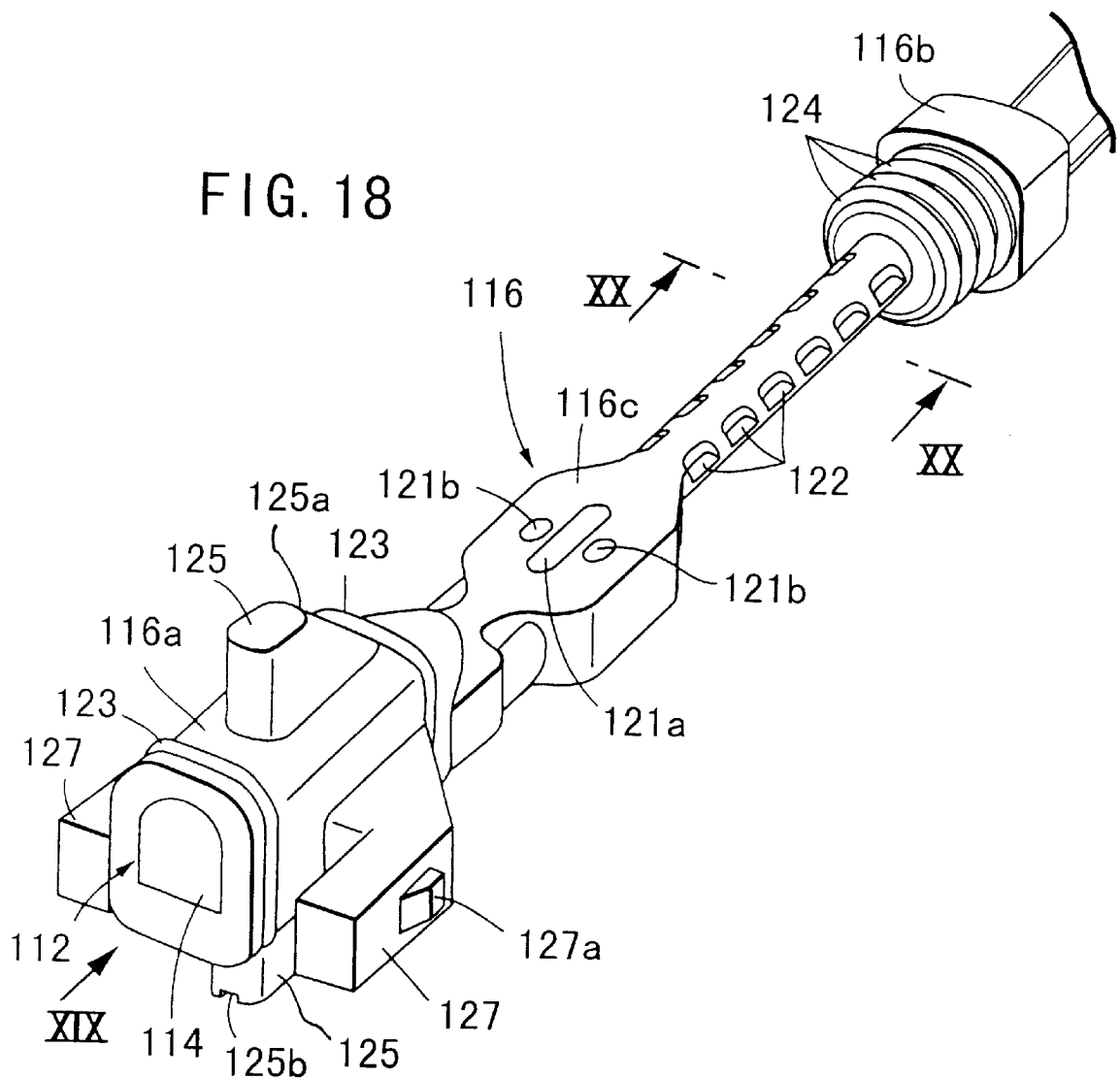
FIG. 18 is a perspective view of an inner core.
Figure 19:
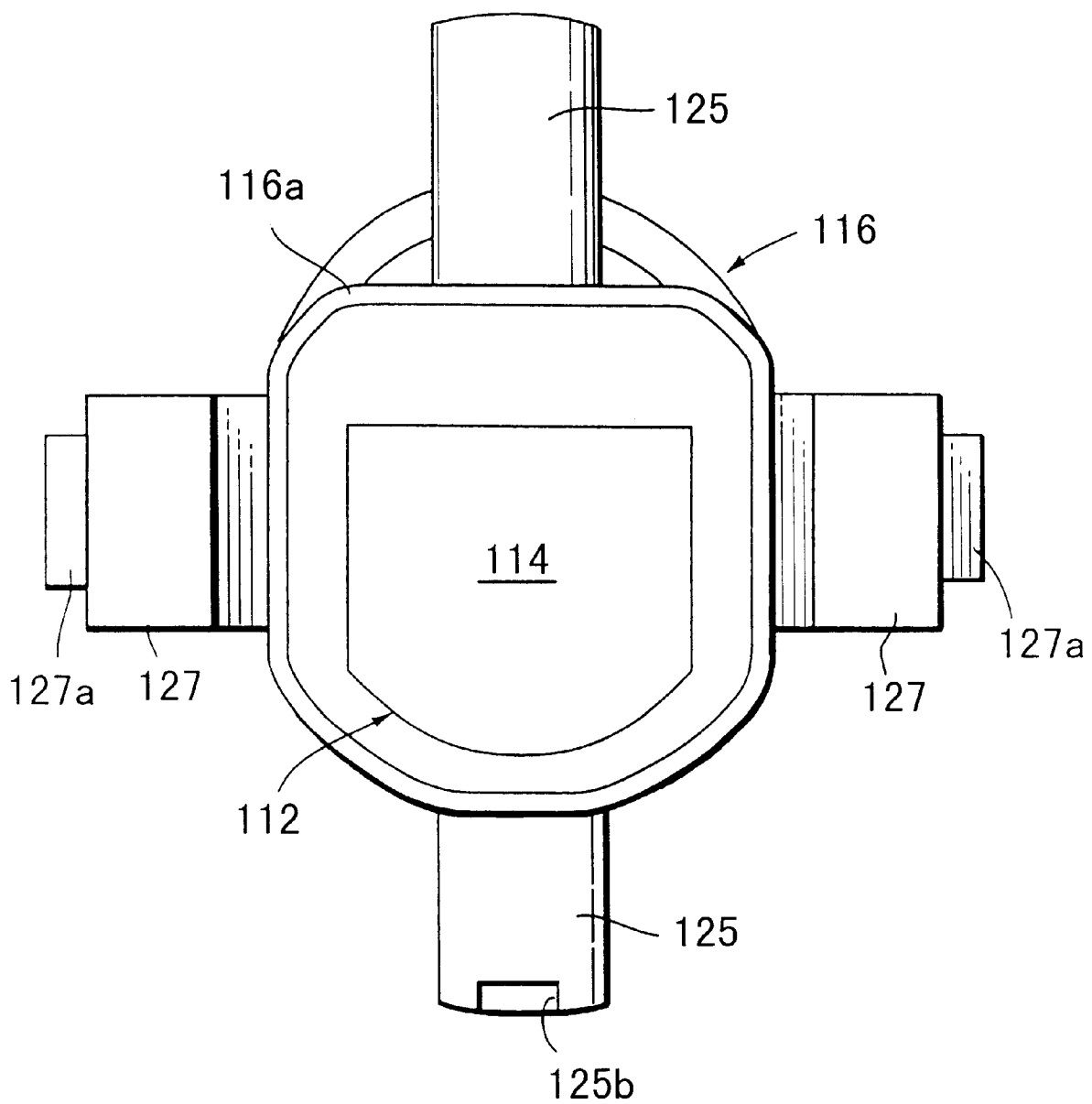
FIG. 19 is an enlarged view taken in the direction of arrow XIX in FIG. 18.
Figure 20:
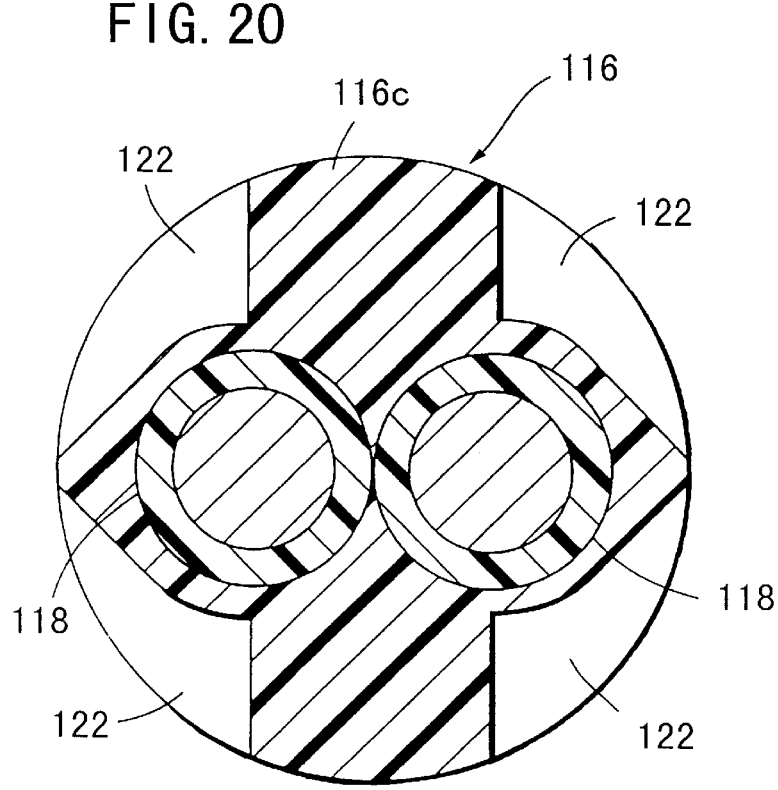
FIG. 20 is an enlarged cross sectional view taken along line XX—XX in FIG. 18.
Figure 21:
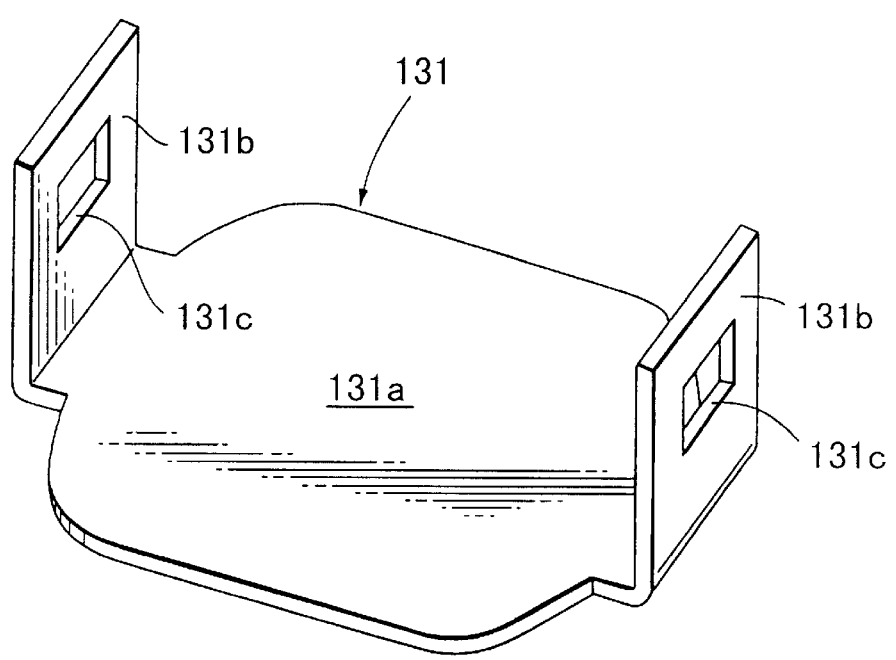
FIG. 21 is a perspective view of a protector.
Figure 22:
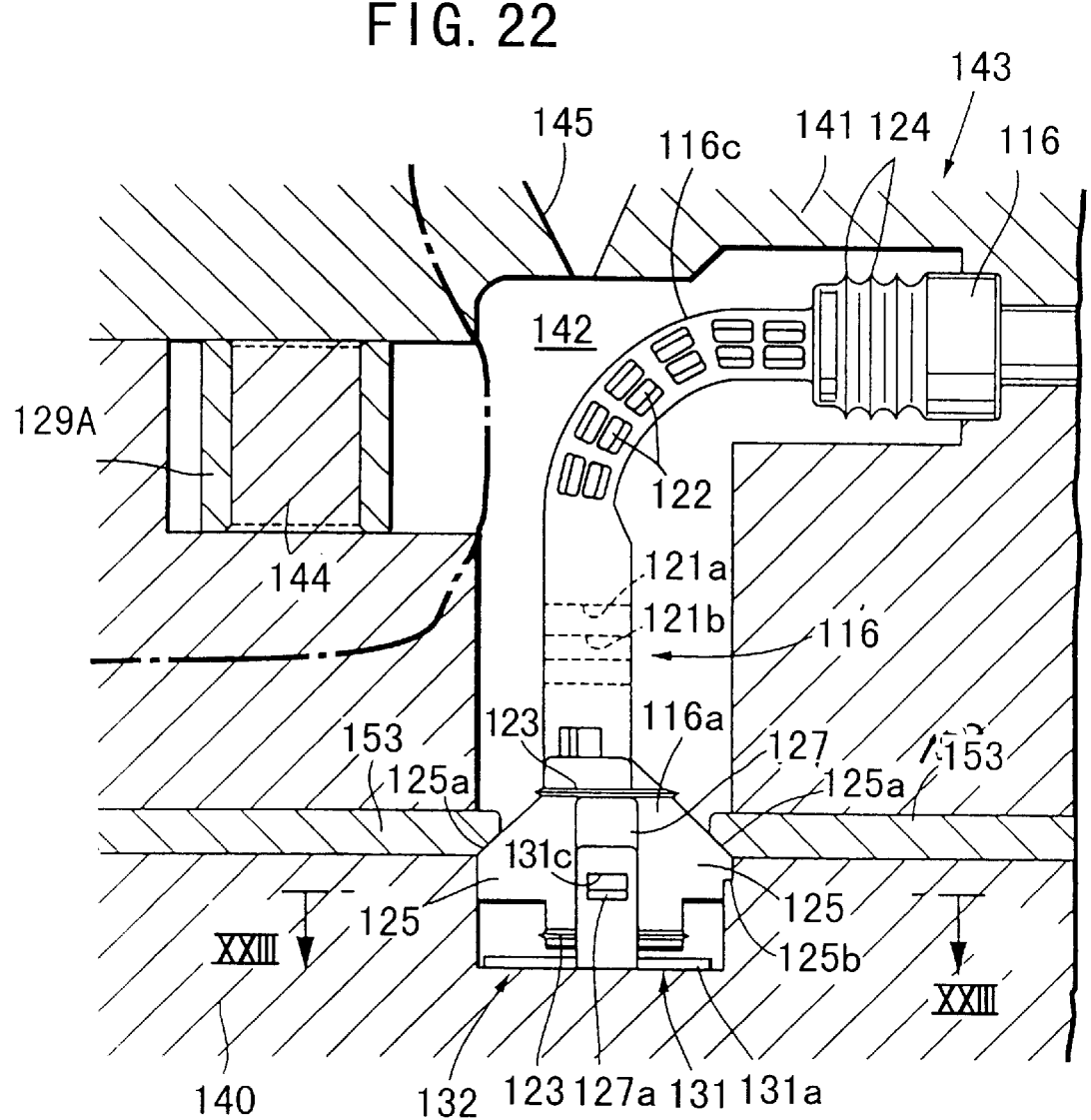
FIG. 22 is a longitudinal cross sectional view of a mold device for molding an outer shell.
Figure 23:
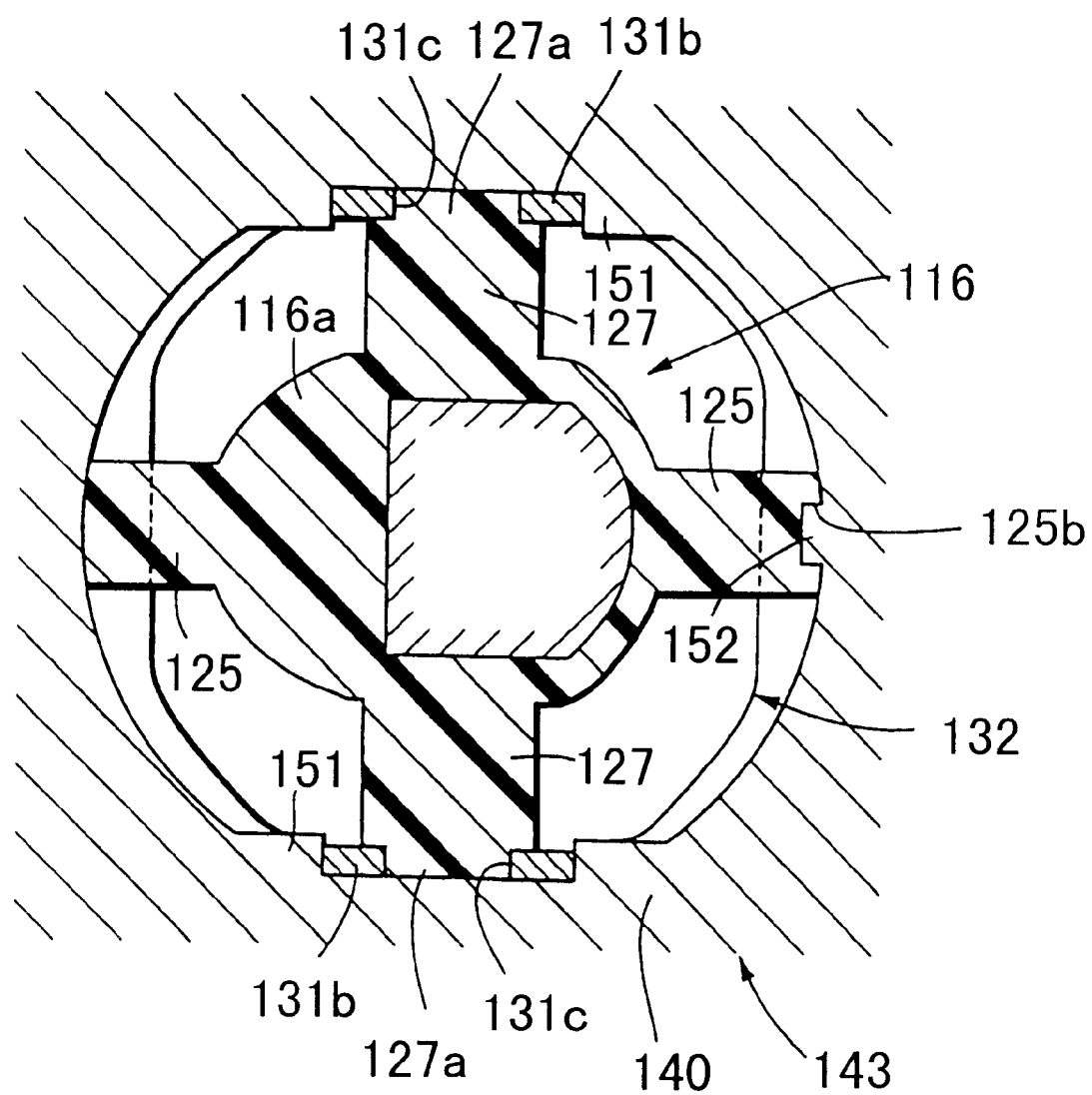
FIG. 23 is a cross sectional view taken along line XXIII—XXIII in FIG. 22.

FIG. 11 is a side elevational view of a sensor device, FIG. 12 is a view taken in the direction of arrow XII in FIG. 11, FIG. 13 is a longitudinal cross sectional view of a sensor device, FIG. 14 is a perspective view showing a connection state of an IC module and a cord, FIG. 15 is a longitudinal cross sectional view of a mold device for molding an inner core taken along line XV—XV in FIG. 16, FIG. 16 is a cross sectional view taken along line XVI—XVI in FIG. 15, FIG. 17 is an enlarged cross sectional view taken along line XVII—XVII in FIG. 15, FIG. 18 is a perspective view of an inner core, FIG. 19 is an enlarged view taken along the direction of arrow XIX of FIG. 18, FIG. 20 is an enlarged cross sectional view taken along line XX—XX in FIG. 18, FIG. 21 is a perspectaive view of a protector, FIG. 22 is a longitudinal cross sectional view of a mold device for molding an outer shell and FIG. 23 is an enlarged cross sectional view taken along line XXIII—XXIII in FIG. 18.

First, referring to FIG. 11 to FIG. 13, this sensor device is used as a vehicular wheel speed sensor. An IC module 112 is housed and fixed in a housing 111 secured to a fixed support 110 and a cord 113 connected to an IC module 112 extended from the housing 111. A metallic protector 131 for covering the top end of the IC module 112 is attached to the top end of the housing 111.

The IC module 112 has a detection portion 114 including a magnet and a Hall IC, a capacitor, a substrate, a pair of terminals 115, 115, and the like and is housed and fixed in the housing 111 such that the detection portion 114 is disposed at the top end of the housing 111, and such that the paired terminals 115, 115 are disposed so as to face the rear side.

The housing 111 is made up of an inner core 116 molded from a relatively soft synthetic resin such as polyurethane and an outer shell 117 which is molded from a relatively synthetic resin more rigid than the inner core 116 such as glass fiber-incorporated polyamide for covering the inner core 116.

In FIG. 14, the cord 113 comprises a pair of bundled signal lines 118, 118 covered with an insulative covering material 119 formed of a synthetic resin. The portion of each of the signal lines 118, 118 extended from one end of the insulative covering material 119 is connected with each terminal 115, 115 of the IC module 112 by caulking using each of joints 120, 120 made of a conductive metal, welding, or like other means.

The IC module 112 and the cord 113 are connected to each other, as shown in FIG. 14, and set in a mold device 135 for molding an inner core shown in FIG. 15 and FIG. 16. This mold device 135 for molding the inner core has a pair of molds 136 and 137 which are separable from each other, and a cavity 138 corresponding to the external shape of the inner core 116 is formed between both of the molds 136 and 137 when they are clamped. The IC module 112 and the cord 113 connected to each other are inserted into the cavity 138 so as to position the IC module 112 between both of the molds 136 and 137. On one of the molds 136 and 137, for example, on the mold 136, a protrusion 139 is provided integrally so as to be interposed between each of the connection portions of the terminals 115, 115 of the IC module 112 and the signal lines 118, 118 of the cord 113.

Further, on both of the molds 136 and 137, pairs of slide pins 133, 133 and 134, 134 are slidably disposed to hold both sides of the connection portions, that is, the joints 120, 120 of the terminals 115, 115 for the IC module 112 and the signal lines 118, 118 of the cord 113. By holding the joints 120, 120 between the slide pins 133, 133 and 134, 134, the joints 120, 120 are prevented from bouncing when a synthetic resin is charged into the cavity 138.

Then, when a soft synthetic resin such as polyurethane is charged into the cavity 138, an inner core 116 molded from the soft synthetic resin so as to cover one end of the insulative covering material 119 of the cord 113, the paired signal lines 118, 118 extending from one end of the insulative covering material 119, the IC module 112, and the connection portions of the terminals 115, 115 between the IC module 112 and the signal lines 118, 118.

Referring to FIG. 18 and FIG. 19 together, the inner core 116 has, integrally provided therewith a first covering portion 116a substantially of a polyhedral form for covering the IC module 112, with the detection portion 114 being disposed flush with the top end, a second covering portion 116b for covering one end of the insulative covering material 119, and a third covering portion 116c for covering the signal lines 118, 118 and the connection portions of the signal lines 118, 118 and the IC module 112, for joining the first and second covering portions 116a, 116b to each other.

In the third covering portion 116c, when the inner core 116 is molded, a through hole 121a is formed between each of the connection portions of the terminals 115, 115 for the IC module 112 and the signal lines 118, 118 extended from one end of the insulative covering material 119, corresponding to the protrusion 139 provided to the mold 136. Also, the third covering portion 116c is formed with through holes 121b, 121b at the positions of the joints 120, 120 by the slide pins 133, 133 and 134, 134 for holding the joints 120, 120 on both sides.

Further, at a plurality of locations (for example, six locations) each with a lengthwise interval at the outer periphery of a portion of the third covering portion 116c close to the second covering portion 116b, a plurality (for example, four) of concave portions 122, 122 . . . are formed as shown in FIG. 18 and FIG. 10. These concave portions 122, 122 . . . are produced by protrusions (not shown) provided at four places in the circumferential direction on the molds 136 and 137 so as to be opposed to and close to the outside surface at a plurality of locations (for example, at six locations) in the lengthwise direction of the cord 113 when the cord 113 is set in the mold device 135 for molding the inner core. When the cord 113 is aligned by such protrusions, the bounce and torsion of the cord 113 in the mold device 135 for molding the inner core are prevented. Moreover, molten synthetic resin flows into the concave portions 122, 122 . . . when the outer shell 117 is molded, and this gives tight engagement between the inner core 116 and the outer shell 117.

At the outer periphery of the first covering portion 116a, a pair of intruding protrusions 123, 123 are provided around the circumference at positions distant from each other. At the outer periphery of the second covering portion 116b, a plurality of intruding protrusions 124, 124 . . . are provided around the circumference at positions distant from each other. When the outer shell 117 is molded the top ends of these intruding protrusions 123, 123; 124, 124 . . . melt and adhere to the inside surface of the outer shell 117 so as to cover the inner core 116, which can also give tight engagement between the inner core 116 and the outer shell 117.

The outer periphery of the first covering portion 116a has, provided integrally therewith, a pair of fitting arms 127, 127 positioned on the sides opposite to each other; and a pair of engagement protrusions 125, 125 positioned on the sides opposite to each other so as to be located on a straight line perpendicular to a line connecting both of the fitting arms 127, 127.

Each of the fitting arms 127, 127 has a substantially L-shaped configuration so as to protrude toward the top end from the top end face of the first covering portion 116a. On the outer side face of each of the fitting arms 127, 127, is integrally provided an engagement claw 127a. Each of the engagement protrusions 125, 125 is formed into a trapezoidal shape having a slope 125a, 125a . . . on the side facing the third covering portion 116c. On the outer face at the top end of one engagement protrusion 125, a positioning groove 125b is formed with a top end being open.

Referring to FIG. 21, the protector 131 has a flat plate cover 131a which is in contact with the top ends of the fitting arms 127, 127 to cover the top end of the first covering portion 116a, that is, the detection portion 114 of the IC module 112, and a pair of engagement legs 131b, 131b extending from the plate cover 131a so as to be in contact with lateral outer sides of the fitting arms 127, 127. The protector 131 is formed of a metal such as stainless steel. Each of the engagement legs 131b, 131b is formed with a rectangular engagement hole 131c for engaging with each of the engagement claws 127a, 127a of the fitting arms 127, 127.

Before the outer shell 117 is molded, an inner core assembly 132 is formed by attaching the protector 131 to the inner core 116. That is to say, the engagement claws 127a, 127a are engaged with the engagement holes 131c, 131c of the engagement legs 131b, 131b, respectively, in a state in which the plate cover 131a of the protector 131 is brought into contact with the top ends of the fitting arms 127, 127, by which the protector 131 is attached to the inner core 116. In the inner core assembly 132 in which the protector 131 is attached to the inner core 116, a gap which is filled with a synthetic resin for forming the outer shell 117 is formed between the top end of the first covering portion 116a of the inner core 116, that is, the detection portion 114 of the IC module 112 and the cover plate 131a of the protector 131.

As shown in FIG. 22 and FIG. 23, the inner core assembly 132 is set in a mold device 143 for the molding the outer shell having a lower mold 140 and an upper mold 141 for defining a cavity 142 corresponding to the external shape of the outer shell 117 between the upper mold 141 and the lower mold 140 so that the cover plate 131a of the protector 131 is brought into contact with the bottom face of the cavity 142.

The lower mold 140 of the mold device 143 for molding the outer shell is provided with a pair of positioning portions 151, 151 which hold both sides of the fitting arms 127, 127 of the inner core 116 between them and are in contact with portions of the engagement legs 131b, 131b of the protector 131 close to the plate cover 131a, and a fitting portion 152 fitting to the positioning groove 125b of the inner core 116. The inner core 116 is positioned in the mold device 143 in the direction perpendicular to the lengthwise direction by the positioning portions 151, 151 and the fitting portion 152.

Also, a pair of slide molds 153, 153 are slidably provided to the lower mold 140 for positioning the inner core 116 in the mold device 143 in the lengthwise direction by engaging the top ends to the slopes 125a, 125a of the engagement protrusions 125, 125 of the inner core 116.

As shown in FIG. 11 to 13, the outer shell 117 is integrally provided with a bracket 129 extending to the outside. In this bracket 129, a metallic collar 129A is integrally buried so that a bolt (not shown) for fastening the outer shell 117, namely, the housing 111 to the support 110 is inserted. The lower mold 140 is integrally provided with a core 144 to be inserted in the collar 129A.

Thus, a rigid synthetic resin such as glass fiber-incorporated polyamide is charged into the cavity 142 through a gate 145 provided in the upper mold 141 in a state where the position of the inner core 116 in the lengthwise direction of the first covering portion 116a and in a plane perpendicular to the lengthwise direction is determined in the mold device 143 for the molding outer shell. Thus, the outer shell 117 is molded by the mold device 143 for molding the outer shell. The outer shell 117 is molded such that the outer shell 117 covers most of the inner core assembly 132 while exposing the plate cover 131*a* of the protector 131 to the outside.

Then, the IC module 112 is housed and fixed in the housing 111 comprising the inner core 116 and the outer shell 117 such that the detection portion 114 is disposed at the top end of the housing 111. The cord 113 extends from the housing 111 so that one end of the insulative covering material 119 is connected to the rear end of the housing 111, and the portions of the signal lines 118, 118 extended from one end of the insulative covering material 119 are connected to the IC module 112 in the housing 111. Further, the protector 131 for covering the detection portion 114 is attached to the housing 111.

When the outer shell 117 is molded, the through holes 121*a*, 121*b*, 122 in the inner core 116 are filled with the synthetic resin of the outer shell 117. On the outer surface of the outer shell 117, the positioning groove 125*b* of the inner core 116 is left as it is. Also, there are formed concave portions 157, 157 for exposing a part of the protector 131 to the outside corresponding to the positioning portions 151, 151 of the lower mold 140 and concave portions 158, 158 for exposing the slopes 125*a* of the inner core 116 to the outside corresponding to the slide molds 153, 153.

The function and the effect of this embodiment are substantially identical with those of the embodiment described previously with reference to FIG. 1 to FIG. 10.

In this sensor device equipped with the protector, the inner core 116 is provided with the fitting arms 127, 127 which can position the inner core 116 with respect to the outer shell 117 by engaging with the positioning portions 151, 151 provided on the mold device 143 for molding the outer shell and has the function of attaching the protector 131 to the inner core 116, and is provided with the positioning groove 125*b* for fitting the fitting portion 152 provided on the mold device 143 for molding the outer shell. Therefore, when the inner core 116 is inserted into the mold device 143 at the time of molding the outer shell 117, the position of the inner core 116 in the direction perpendicular to the lengthwise direction relative to the outer shell 117 is determined easily, so that the relative position between the inner core 116 and the outer shell 117 can be determined accurately without using any additional positioning means. This can enhance the productivity of the housing 111. The positioning groove 125*b* is formed only to one of the engagement protrusions 125, 125, so that the posture of the inner core 116, that is, the inner core assembly 132 can always be determined properly in the mold device 143 for molding the outer shell by fitting the fitting portion 152 to the positioning groove 125*b* when the inner core assembly 132 is set in the mold device 143 for molding the outer shell.

Further, in the inner core 116, the through hole 121*a* is formed between the connection portions for the signal lines 118, 118 and the terminals 115, 115 of the IC module 112. The through hole 121*a* is formed by disposing the protrusion 139 integral with the mold 136 between the connection portions when the inner core 116 is molded by the mold device 138 for molding the inner core. Therefore, even if the connection portions are located close to each other, short-circuit between the connection portions and short-circuit caused by the mutual contact of fine wires fluffing from the conductors for the signal lines 118, 118 are prevented, so that the size of the inner core 116 and the housing 111 can be reduced while the insulating property being enhanced. Moreover, since the through hole 121*a* is filled with the outer shell 117 covering the inner core 116 upon resin molding, insulating can be further enhanced.

Particularly, in this embodiment, when the outer shell 117 is molded by the mold device 143 for molding the outer shell, the inner core assembly 132 in which the protector 131 has previously been attached to the inner core 116 is inserted into the mold device 143. Therefore, when the housing 111 is formed by the inner core 116 and the outer shell 117, the protector 131 has already been attached to the housing 111, so that the troublesome work for attaching the protector 131 to the housing 111 after molding is no more necessary, which can facilitate attachment of the protector 131 to the housing 111.

While descriptions have been made to the preferred embodiments of the present invention, the present invention is not limited to the above mentioned embodiments, but various changes of design can be made without departing from the scope of the invention as defined in the claims.

What is claimed is:

1. A sensor device comprising:

a housing (11) capable of being secured to a fixed support (10);

an IC module (12) having a detection portion (14), the module being housed and fixed in the housing (11) so that the detection portion (14) is disposed at the top end of the housing (11); and a cord (13) in which a plurality of signal lines (18,18 . . . ) are covered with an insulative covering material (19), one end of the covering material (19) is joined to the rear end of the housing (11), and the portions of the signal lines (18,18 . . . ) extended from one end of the insulative covering material (19) are electrically connected with the IC module (12) in the housing (11), wherein the housing (11) is composed of:

an inner core (16) which is molded from a synthetic resin so as to cover one end of the insulative covering material (19), the signal lines (18,18 . . . ) extended from one end of the insulative covering material (19), the IC module (12) and connection portions between each of the signal lines (18,18 . . . ) and the IC module (12) and an outer shell (17) made of a synthetic resin and molded to the outer periphery of the inner core (16) so as to cover the inner core (16), wherein the inner core (16) has, at the outer periphery thereof, an outer circumference defining a substantially polygonal shape in cross section, wherein engaging protrusions are disposed on each face of said substantially polygonal shape, said engaging protrusions (25–28) adapted for engagement with and abutting on positioning recesses (30) disposed to a mold device (43) for molding the outer shell (17) in order to position the inner core (16) relative to the outer shell (17).

2. A sensor device as defined in claim 1, wherein the inner core (16) is made of a soft synthetic resin and the outer shell (17) is made of a rigid synthetic resin.

3. A sensor device comprising:

a housing (11) capable of being secured to a fixed support (10);

an IC module (12) having a detection portion (14), the module being housed and fixed in the housing (11) so that the detection portion (14) is disposed at the top end of the housing (11); and a cord (13) in which a plurality of signal lines (18,18 . . . ) are covered with an insulative covering material (19), one end of the covering material (19) is joined to the rear end of the housing (11), and the portions of the signal lines (18,18 . . . ) extended from one end of the insulative covering material (19) are electrically connected with the IC module (12) in the housings (11), wherein the housing (11) is composed of:
an inner core (16) which is molded from a synthetic resin so as to cover one end of the insulative covering material (19), the signal lines (18,18 . . . ) extended from one end of the insulative covering material (19), the IC module (12) and connection portions between each of the signal lines (18,18 . . . ) and the IC module (12) and an outer shell (17) made of a synthetic resin and molded to the outer periphery of the inner core (16) so as to cover the inner core (16), wherein a through hole (21) is formed in the inner core (16) at a location between each of the connection portions of the signal lines (18, 18 . . . ), the through hole (21) being filled with a molten resin of the outer shell (17) upon its molding.

4. A sensor device comprising;

a housing (111) capable of being secured to a fixed support;

an IC module (112) having a detection portion (114), the module being housed and fixed in the housing (111) so that the detection portion (114) is disposed at the top end of the housing (111); and a cord (113) in which a plurality of signal lines (18, 18 . . . ) are covered with an insulative covering material (119), one end of the covering material (119) is joined to the rear end of the housing (111), and the portions of the signal lines (118, 118 . . . ) extended from one end of the insulative covering material (119) are electrically connected with the IC module (112) in the housing (111), and a metallic protector (131) attached to the housing (111) so as to cover the detection portion (114), wherein the housing (111) is composed of:
an inner core (116) which is molded from a synthetic resin so as to cover one end of the insulative covering material (119), the signal lines (18, 18 . . . ) extended from one end of the insulative covering material (119), the IC module (112) and connection portions between each of the signal lines (118, 118 . . . ) and the IC module (112), to which the protector (131) is attached to form an inner core assembly (132), and an outer shell (117) made of a synthetic resin and molded to the outer periphery of the inner core (116) so as to cover the inner core (116) such that a part of the protector (132) is exposed to the outside.

5. A sensor device as defined in claim 4, wherein the inner core (116) is made of a soft synthetic resin and the outer shell (117) is made of a rigid synthetic resin.

6. A sensor device as defined in claim 4, wherein the inner core (116) has, at the outer circumference thereof, fitting arms (127) for lengthwise positioning and positioning grooves (125*b*) for positioning in the direction perpendicular to the lengthwise direction of the inner core (116) relative to the outer shell (117).

7. A sensor device as defined in claim 4, wherein holes (121*a*, 121*b*; 122) are formed in the inner core at a location between each of the connection portions of the signal lines (118, 118 - - -), the holes (121*a*, 121*b*; 122) being filled with a molten resin of the outer shell (117) upon its molding.

* * * * *